United States Patent Office 3,328,373
Patented June 27, 1967

3,328,373
PROCESS FOR PURIFICATION OF POLYPROPYLENE
Joseph H. Tazewell, Akron, Ohio, and Chris E. Best, deceased, late of Akron, Ohio, by The Firestone Bank, administrator, Akron, Ohio, assignors to The Firestone Tire & Rubber Company, Akron, Ohio, a corporation of Ohio
No Drawing. Continuation of application Ser. No. 259,779, Feb. 18, 1963. This application Aug. 4, 1966, Ser. No. 570,376
7 Claims. (Cl. 260—93.7)

The application is a continuation of our application Ser. No. 259,779 filed Feb. 18, 1963, now abandoned.

The invention relates to the removal of ash from polypropylene produced in the presence of titanium-containing catalyst. Residual ash in the polymer is detrimental to light stability, heat stability and electrical properties; and is corrosive to processing equipment.

The catalyst is produced by mixing together (A) Sodium metal
(B) An aluminum-reduced, activated preparation of titanium tetrachloride, hereinafter referred to, for convenience as titanium chloride
(C) Tetrakis(dimethylamino)silane, hereinafter referred to as TDSI This catalyst gives a reasonably good product but hardness and rigidity can still be improved by including an organozinc modifier.

As to the relative proportions of the ingredients, a sufficient amount of the sodium metal will be used in order to effect the extent of reduction required to impart full catalytic activity. When the sodium is used in at least 1:1 mol ratio relative to the titanium compound, examination of the catalyst reveals the presence of free sodium metal, indicating that all of the reduction necessary for catalytic activity has been supplied by such amount of sodium. Lesser amounts of sodium may be used providing that the extent of reduction effected imparts full catalytic activity. The upper limit of the sodium content is not critical, and is set mainly by economic considerations of cost of supplying unnecessary reducing agent. As indicated above it has been found satisfactory to operate in the range of 1.0 or more mols of the sodium per mol of titanium chloride.

As to the amount of TDSI to be used, very small amounts in the range 0.01 to 10 gram-atoms of amino nitrogen in the alkylaminated silicon compound per mol of sodium metal will suffice. The preferred amount is 0.1 but it will be appreciated that the upper limit will be imposed by economic considerations of supplying unneeded compound, rather than any technical considerations. Usually, no more of the hydrocarbonaminated compound will be used than will be sufficient to provide 10 gram-atoms of amino nitrogen per mol of reducing agent. The catalysts used in the invention may be prepared either in the presence or absence of the propylene, but preferably the catalyst ingredients are brought together in the presence of a substantial proportion, say 10% or more, of the propylene to be polymerized, as the most active catalysts are obtained in this manner.

The polymer-structure-modifier is zinc diethyl or some other suitable organozinc compound such as di-n-propyl zinc, di-n-butyl zinc, ethyl n-propyl zinc, di-(2-ethyl hexyl) zinc and the like. In accordance with this invention it is recommended that in the case of zinc diethyl, it be used in relatively small amounts, about .005 to .075 mol per mol of the titanium chloride in the catalyst. It should be noted that if the diethyl zinc is introduced into the system, in the amounts recommended above, and the catalyst ingredients, omitting the sodium, are added and the mixture allowed to react, the resultant product is almost totally ineffective in polymerizing propylene. It seems quite clear therefore that the diethyl zinc has no catalytic function but operates primarily, but quite effectively, as a modifier of the polymer structure which is produced by the present catalyst.

It should also be noted that while larger proportions of the zinc compound than those recommended herein may be used for example, .075 to .125 mol or even more per mol of the titanium compound, according to the present invention, the extra amount of zinc compound over the recommended range seems to perform no function and is accordingly not strictly necessary to the practice of the present invention. The use (and consumption) of excess zinc compound merely adds to the cost without realizing any advantage therefrom. To repeat, if amounts of zinc compound in excess of the recommended range should be used, the extra amounts would be non-functional, performing no useful purpose and resulting in no harm except as incurring waste of the excess material as noted above.

Insofar as the sodium metal ingredient is concerned, the commercially available products are satisfactory for the preparation of the dispersion which is used. The dispersion is prepared by subjecting the sodium to a high speed shearing operation in a liquid hydrocarbon above the melting point of the sodium such that a stable dispersion of fine particle size, not greater than 15 microns, is obtained.

Insofar as the titanium chloride ingredient is concerned, satisfactory results are obtained by using the product prepared by heating metallic aluminum with titanium tetrachloride at moderately elevated temperatures on the order of 90° C. in approximately the mol ratio of 3 mols of titanium tetrachloride to 1 gram-atom of aluminum metal. The reaction product has the empirical formula $Ti_3AlCl_{12}$, and appears to be a true compound of all of these elements, since any excess of titanium tetrachloride may be leached therefrom down to, but not beyond, the composition of the formula given.

The simple reaction product prepared as just described should preferably be subjected to an "activation" process, after which it is known as an "activated" preparation and is suitable for use in this invention. For example an "activated" product is prepared by subjecting the $Ti_3AlCl_{12}$ to intensive grinding as in a ball mill, edge runner, roll mill, disc mill, impact mill or the like. In general the extent of the grinding should be such as to be equivalent to one to several days ball milling, and is best determined empirically for any type of milling procedure by observing the improvement in performance (yield and isotacticity of product) as it varies with duration of grinding. This grinding not only serves to reduce the particle size, but also seems to develop certain catalytically active, strained crystal defect areas in the material, as the crystalline X-ray diffraction pattern changes progressively during the grinding.

An activated $Ti_3AlCl_{12}$ which has proven satisfactory is that which is sold commercially by the Stauffer Chemical Corporation under the trade designation "AA," and will be referred to herein by that trademark.

The TDSI ingredient referred to above is tetrakis(dimethylamino)silane of the formula

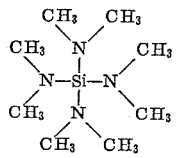

The catalyst used in this invention is prepared by mixing and agitating together (A) the sodium metal reducing agent plus (B) the titanium chloride plus (C) the TDSI, preferably in heptane or the like. These ingredients may be combined simultaneously or in any order: thus in some cases it may be desirable to pre-react two of the catalyst components before adding the other component. Temperature of mixing may vary within wide limits, usually between −10° C. or lower, say down to −100° C. up to temperatures on the order of 150° C. Preferably the temperature will be in the range 20° C. to 100° C. These temperature ranges apply also to the polymerization reaction proper. As to the relative proportions of the ingredients, a sufficient amount of the sodium metal will be used in order to effect the extent of reduction required to impart full catalytic activity. When the sodium is used in at least 1:1 mol ratio relative to the titanium compound, examination of the catalyst reveals the presence of free sodium metal, indicating that all of the reduction necessary for catalytic activity has been supplied by such amount of sodium. The upper limit of the sodium content is not critical, and is set mainly by economic considerations of cost of supplying unnecessary reducing agent.

As to the amount of TDSI to be used, a very small amount will suffice. It will be appreciated that the upper limit will be imposed by economic considerations of supplying unneeded compound, rather than any technical considerations. The catalysts used in this invention may be prepared either in the presence or absence of the propylene, but preferably the catalyst ingredients are brought together in the presence of a substantial proportion, say 10 percent or more by weight, of the propylene to the polymerized, as the most active catalysts are obtained in this manner.

The polymer-structure-modifier is zinc diethyl or some other suitable organozinc compound such as di-n-propyl zinc, di-n-butyl zinc, ethyl n-propyl zinc, di-(2-ethyl hexyl) zinc and the like. In accordance with this invention it is recommended that in the case of zinc diethyl, it be used in relatively small amounts, about .005 to .075 mol per mol of titanium chloride catalyst. Higher proportions, say .075 to 0.125 mol or even more per mole of the titanium chloride may be used, but the extra amount of zinc compound over the recommended range seems to perform no function and merely adds to the cost without realizing any advantage therefrom. It should be noted that if the diethyl zinc is introduced into the system, in the amounts recommended above, and the catalyst ingredients, omitting the sodium, are added and the mixture allowed to react, the resultant product is almost totally ineffective in polymerizing propylene. It seems quite clear therefore that the diethyl zinc has no catalytic function but operates primarily, but quite effectively, as a modifier of the polymer structure which is produced by the present catalyst.

*The polymerization operation*

The polymerization is carried out by contacting monomeric propylene with the catalyst in the presence of the polymer-structure-modifier, in an inert organic liquid vehicle such as heptane. The catalyst will either have been previously prepared in a separate operation, or will be prepared in situ in the polymerization vessel, this latter method being especially convenient where the catalyst is prepared in the presence of the monomer; in such case the vehicle and monomer are charged to the polymerization vessel first, and the catalyst ingredients are charged and agitated together to form the catalyst. The polymer-structure-modifier comprising a suitable organozinc compound such as diethyl zinc is then added, and the contents of the vessel adjusted to polymerization temperature if this is to be different from the charging temperature.

Hydrogen is advantageously incorporated in the polymerization mass, for instance in amounts of .0001–.05 mol per mol of propylene monomer in order to regulate the molecular weight of the polymer by bubbling it into the reaction mixture during the polymerization.

The polymerization temperature may vary within wide limits, usually between −10° C. or lower, say down to −100° C., up to temperatures on the order of 150° C. Preferably the temperature will be in the range 20° C. to 100° C. The mass is usually agitated sufficiently to insure contact of the reactants with each other and to avoid premature segregation of the product. The amount of vehicle used should preferably be sufficient to avoid difficulty in agitation during the reaction, i.e., so that the concentration of the final polymer will be not over about 50 percent, based on the total weight of polymer and vehicle. The amount of catalyst should be such that it will reach economic exhaustion at the same time that the vehicle contains all of the polymer it can carry without difficulty in agitation. Ordinarily it will be expected that each gram of catalyst will produce from 15 to 100 grams of polymer. The polymerization may be carried out batchwise, or in a continuous manner wherein the catalyst (or ingredients thereof), vehicle and monomer are continuously introduced into the reactor chain.

The polypropylene produced in this way is hard and stiff. For example, under optimum conditions, the polypropylenes of this invention will have Rockwell hardnesses on the order of 56 or better on the M scale, or 105 or better on the R scale and bending moduli in excess of 240,000 p.s.i. and in some cases in excess of 300,000 p.s.i.

*Purification treatment*

On completion of the polymerization, the resulting slurry is treated with a purification agent in the presence of a lower alcohol (that is an alcohol containing 1 to 5 carbon atoms), methanol being preferred, followed by neutralization to a pH of 6 to 7, preferably at an elevated temperature. Usually sodium methylate is used as the neutralizing agent. The purification agent is selected from the group consisting of acetyl acetone (2,4-pentanedione), aluminum chloride, sodium methylate, and salicylic acid. Usually about 2 mols of purification agent is used per mol of the titanium in the polymerization catalyst. More generally, 1 to 3 mols of the purification agent may be used per mol of the titanium present, although use of an excess of purification agent is not harmful. As mentioned, sodium methylate is customarily used to neutralize the solvent in the slurry during the action of the purification agent, and if sodium methylate is used as the purification agent, the amount used for neutralization is in excess of that suggested for use as the purification agent.

If the catalyst residue is contacted by air or water it becomes insoluble, so the purification treatment is usually applied promptly, and before any substantial cooling of the polymer.

The following example illustrates the process:
The following materials are utilized in the preparation of the polymer, in the amounts stated:

|  | Parts by weight |
|---|---|
| Propylene | 100 |
| Heptane | 211 |
| Titanium chloride (AA) | 1.60 |
| TDSI | 0.412 |
| Sodium | 0.206 |
| Diethyl zinc | 0.012 |
| Hydrogen | 0.065 |

The polymerization process is carried out in the absence of air and water, in a closed vessel in which the pressure is maintained at about 100 to 150 pounds per square inch (gauge). The propylene and hydrogen are bubbled through the solvent which contains the catalyst. About one-quarter of the total propylene and hydrogen are bubbled through the heptane before adding the catalyst. The contents of the vessel are heated to 100 to 130° F., the catalyst is then added, and such a temperature is maintained by cooling while the remainder of the propylene is being added.

The introduction of the propylene and hydrogen is continued for 2 hours and agiation is continued until no more solid polymer is formed and the pressure drops. The amount of hydrogen used is that required to give the desired melt index of the polymer.

In the purification treatment, methanol is added in an amount equal to 3 to 5 percent, by volume, of the total heptane used. The purification agent is added in an amount equal to 2 mols for each mol of titanium in the catalyst. It may be added dissolved in methanol. Acetyl acetone is the preferred purification agent, and it is most efficient at elevated temperature, a temperature around 160° F. being satisfactory.

Instead of acetyl acetone, one may use an equivalent amount of any of the other purification agents, the equivalent amounts being

| | Parts |
|---|---|
| Acetyl acetone | 1.6 |
| Aluminum trichloride | 2.1 |
| Sodium methylate | 0.87 |
| Salicylic acid | 2.2 |

Any satisfactory amount of any of these purification agents or a mixture thereof may be used.

Then methanol is added in an amount about equal to the total heptane employed to complete the coagulation of the polymer and assist in the removal of the solubilized catalyst residue. The slurry is then cooled to about room temperature and sufficient sodium methylate (about 0.28 part by weight) is added to bring the pH of the slurry to 6 to 7. The polymer is filtered, reslurried in methanol and filtered again. Dilauryl thiodipropionate is advantageously added to the purified polymer as stabilizer.

The ash content of the washed and dried polymer was 0.01 percent. The ash content will vary from 0.001 to 0.5 percent, depending upon the purification agent used, the conditions employed, etc. The product is colorless.

Variations may be made in the temperatures used, and in the amounts of the various materials employed within the range of accepted practices.

We claim:
1. The process of removing catalyst residue from polypropylene obtained by polymerization of propylene in heptane in the presence of hydrogen and a catalytic amount of a catalyst which includes essentially (1) sodium, (2) tetrakis(dimethylamino) silane, (3) activated titanium chloride as herein defined, and (4) an organozinc compound, which process comprises adding (1) several percent of lower alcohol not greater than 5 percent based on the weight of the heptane and (2) a purification agent of the group consisting of acetyl acetone, aluminum chloride, sodium methylate and salicylic acid, subsequently adding methanol in an amount substantially equal to the amount of heptane, then adding sodium methylate to bring the pH of the slurry between 6 and 7, using substantially 1 to 3 moles of the purification agent per mol of titanium in the catalyst.

2. The process of claim 1 in which diethyl zinc is used as the organozinc compound.

3. The process of claim 1 in which the lower alcohol is methanol.

4. The process of claim 1 in which the purification agent is acetyl acetone.

5. The process of claim 1 in which the purification agent is sodium methylate.

6. The process of claim 1 in which the purification agent is aluminum chloride.

7. The process of claim 1 in which the purification agent is salicylic acid.

No references cited.

JOSEPH L. SCHOFER, *Primary Examiner.*

LAWRENCE EDELMAN, *Assistant Examiner.*

PO-1050
(5/69)

UNITED STATES PATENT OFFICE
CERTIFICATE OF CORRECTION

Patent No. 3,328,373          Dated June 27, 1967

Inventor(s) Joseph H. Tazewell and Chris E. Best

It is certified that error appears in the above-identified patent and that said Letters Patent are hereby corrected as shown below:

Column 5, line 4, "agiation" should read --agitation--;

Column 5, line 39, "0.5" should read --0.05--.

SIGNED AND
SEALED

AUG 26 1969

(SEAL)
Attest:

Edward M. Fletcher, Jr.
Attesting Officer

WILLIAM E. SCHUYLER, JR.
Commissioner of Patents